(12) United States Patent
Huo

(10) Patent No.: US 6,423,295 B1
(45) Date of Patent: Jul. 23, 2002

(54) SYNTHESIS OF ALUMINUM RICH AFI ZEOLITE

(75) Inventor: Qisheng Huo, East Amherst, NY (US)

(73) Assignee: Praxair Technology, Inc., Danbury, CT (US)

(*) Notice: Subject to any disclaimer, the term of this patent is extended or adjusted under 35 U.S.C. 154(b) by 24 days.

(21) Appl. No.: 09/739,279

(22) Filed: Dec. 19, 2000

(51) Int. Cl.[7] ............................................. C01B 39/04
(52) U.S. Cl. ..................... 423/705; 423/706; 423/712; 208/46; 210/767
(58) Field of Search .................. 423/705, 706, 423/712; 208/46; 210/767

(56) References Cited

U.S. PATENT DOCUMENTS

| | | |
|---|---|---|
| 4,061,717 A | 12/1977 | Kerr et al. |
| 4,834,958 A * | 5/1989 | Zones |
| 5,271,921 A * | 12/1993 | Nakagawa ................... 423/702 |
| 5,271,922 A * | 12/1993 | Nakagawa ................... 423/702 |
| 5,283,047 A | 2/1994 | Vaughan et al. ............. 423/713 |

OTHER PUBLICATIONS

S.Cartlidge and W.M. Meier, Papers, Solid state transformations of synthetic CHA–and EAB–Type zeolites in the sodium form, *Zeolites*, 1984, vol. 4, Jul.

R. Bialek and W.M. Meier, "The synthesis and structure of SSZ–24, the silica analog of $AlPO_4$–5", *Zeolites*, 1991, vol. 11, Jun.

Roland H. Daniels, George T. Kerr, and Louis D. Rollmann, "Cationic Polymers as Templates in Zeolite Crystallization", 1978 *American Chemical Society*.

Mario L. Occelli, Harry E. Robson, "Synthesis of Microporous Materials"., vol. 1, p. 373–383, 1992.

* cited by examiner

*Primary Examiner*—David Sample
(74) *Attorney, Agent, or Firm*—Robert J. Follett

(57) ABSTRACT

A low silica AFI zeolite and a high purity gmelinite zeolite that have a $SiO_2/Al_2O_3$ ratio of about 10 or less are provided.

8 Claims, 1 Drawing Sheet

SYNTHESIS OF ALUMINUM RICH AFI ZEOLITE

FIELD OF THE INVENTION

This invention relates to aluminosilicate zeolites, and more particularly to the synthesis and application of aluminum rich (low silica) AFI and GME zeolites.

BACKGROUND OF THE INVENTION

Zeolites are molecular sieves that have a silicate lattice. Typically, they are microporous crystalline materials that can have a variable composition and are characterized by a three dimensional structure that has channels and/or cages. Silicon ($SiO_4$) or aluminum ($AlO_4$) tetrahedrons makeup the zeolite framework.

Zeolites are differentiated from each other by their composition and structure, which determines their physical and chemical properties and the applications in which they will be useful. Typically, structure codes consisting of three letters are assinged to each zeolite. For example, FAU is the structure code for zeolite X, GME for gmelinite, and AFI for $AlPO_4$-5 molecular sieve.

Many zeolites may be reversibly dehydrated with only minor distortions of the framework. It has been shown that the thermal stability of zeolites depends on the cation form. For example, the Na forms of CHA-(chabazite) and EAB-TMA-E(AB) type zeolites (having 6-ring sequences of AABBCC and ABBACC, respectively) transform topotactically to SOD type (sodalite) products above 600° C. in dry $N_2$. The temperature of this transformation depends greatly on the Al content, the numbers of protons, and the amount of water present. By breaking two T'—O—T bridges in a catalytic reaction with water, pivoting T' about the remaining T'—O—T bridges leads to inversion of $T'O_4$ tetrahedra, where T' is Si or Al and T is Si or Al. One noteworthy observation is that potassium ions in 8-ring sites of K exchanged CHA and EAB prevent their transformation to SOD products. In contrast, Na exchanged CHA and EAB transform to SOD products.

Gmelinite (GME) is a well-known aluminosilicate zeolite having a structure in which the main feature is a large 12-ring channel. GME exists naturally as a mineral, and can also be synthesized in the laboratory. CHA-free gmelinite can be synthesized using a polymeric template synthesis system. In addition, another method to synthesize large pore gmelinite is to introduce a transition metal, such as Cr, into the gmelinite framework.

Gmelinite zeolites have a large-pore structure with channels that are defined by twelve membered rings of $SiO_4$ and $AlO_4$. However, the adsorptive properties of gmelinite zeolites are similar to zeolites having smaller pores. The reason for this is that natural and synthetic gmelinites have a propensity to intergrow with chabazite or related zeolites, which creates stacking faults that block and restrict access to the 12-ring channel of the gmelinite structure. The result is a reduction in the expected sorption properties of the zeolite. Elimination of these fault planes would likely increase the adsorptive properties of the gmelinite zeolite. To be a good adsorbent, a zeolite should have a high degree of crystallinity both in its synthesized or natural form and active form.

The AFI zeolite also has a 12-ring structure with large pores. These aluminosilicate materials, particularly aluminum rich (low silica) materials, have been used to separate and purify gases, exchange ions, catalytically convert inorganic/organic compounds, and serve as catalyst supports. The structure comprises a one-dimensional 7.5 A diameter pore system constrained by 12-rings, with relatively smooth channels devoid of cavities. Chevron Research Company has synthesized an all-silica AFI material, known as SSZ-24, using special templates, such as N,N,N-trimethyl-1-adamantammonium hydroxide. Boron-SSZ-24 has also been made by direct synthesis.

There are some similarities between GME and AFI zeolite structures. In the GME framework, tetrahedra are pointing up (U) and down (D) and are commonly described in terms of UUDD chains of 4-rings. For example, UUDD chains are found in the zeolite framework of philipsite, gismondine, gmelinite, and merlinoite.

On the other hand, the AFI framework, has tetrahedra pointing up, with adjacent units pointing down. The AFI framework can be described as UDUD. UDUD chains are found in AlPO-5, AlPO-11, AlPO-25 and AlPO-D.

Most UUDD chains occur in silicate materials, whereas most UDUD chains are found in aluminophosphate materials. This may explain why SSZ-24 does not form as readily as does AlPO-5 because O atoms are connected to the 4-rings in the UDUD chains. In the AlPO-5 structure, one of the Al—O—P angles was recorded to be 178°. This appears to be undesirable in silicate frameworks.

The aluminum ions in the zeolite framework creates an excess negative charge, which can be balanced by ions of alkaline metals (Na, K, Li, Rb and Cs), alkaline earth metals (Mg, Ca, Ba), organic ammonium cations, or hydrogen ions ($H^+$). High aluminum content can increase zeolite acidity, requiring more cations to balance the zeolite framework's negative charges. This enhances the zeolite's catalytic properties.

The focus of the prior art has primarily been to increase the quality of the gmelinite zeolite. Various templates, reaction compositions, and conditions have been tested. Several patents describe the processes employed to increase the quality of the gmelinite zeolite, although none disclose the method of the present invention:

U.S. Pat. No. 4,061,717 to Kerr et al. discloses a process for synthesizing crystalline aluminosilicate zeolites, which are crystallized in an aqueous reaction mixture containing sources of alkali metal oxide, silicate, aluminate and an ionene or ionomer which contains positively charged nitrogen atoms in such quantity as to satisfy some of the cationic sites of the eventual zeolite. In the patent, Kerr described the synthesis of gmelinite using 1,4-dibromobutane (Dab-4Br) as a template. The template serves to eliminate or decrease the number of stacking faults, which normally appear to block gmelinite channels.

U.S. Pat. No. 5,283,047 to Vaughan et al. teaches a synthetic transition metal aluminosilicate crystalline zeolite having a gmelinite structure, a defined chemical composition that has been characterized by a defined X-ray diffraction pattern.

U.S. Pat. No. 4,665,110 to Zones teaches the making of crystalline molecular sieves, such as zeolites, using adamantane compounds as templates. One of the zeolites that may be synthesized is an AFI zeolite known as SSZ-24, which has the AFI structure.

Zones later made Al-SSZ-24 by post-synthesis treating B-SSZ-24 (R. A. van Nordstrand, D. S. Santilli, S. I. Zones, "Aluminum- and Boron-Containing SSZ-24", in *Synthesis of Microporous Materials,* Vol. 1, Molecular sieves (eds. M. L. Occelli, H. Robson), 1992, p.373. Van Nostrand Reinhold, N.Y.). The resulting Al-SSZ-24 has a low aluminum content with a ratio of $SiO_2/Al_2O_3$=100.

SSZ-24 has been used in catalytic applications and separations such as: (1) reforming naphtha with SSZ-24; (2) catalytic reforming naphtha with boron- SSZ-24; (3) extraction of dimethyl paraffins from isomerates relating to the production of high octane fuels with SSZ-24; (4) materials (SSZ-24, Al-SSZ-24, B-SSZ-24, AlPO-5 and SAPO-5) with AFI structure have a strong affinity for the adsorption of branched chain hexanes; (5) materials (Al-SSZ-24 and B-SSZ-24) have inverse shape selectivity as a catalyst.

However, the catalysis, adsorption, and ion-exchange utility of SSZ-24 is limited by the extremely low aluminum content available from the prior art synthesis procedure. This is a significant drawback and hindrance.

Cartlidge (S. Cartlidge, W. M. Meier, *Zeolites,* 1984, 4, 218 and S. Cartlidge, E. B. Keller, W. M. Meier, *Zeolites,* 1984, 4, 226) explained how Na-EAB (zeolite) transitioned into SOD and the stabilization role of potassium ions in K-EAB.

However, the prior art does not teach how to prepare high purity low silica AFI zeolite for potential use in adsorption and catalytic applications. Furthermore, the prior art does not teach how to remove a template from a high purity (fault-free and intergrowth-free) low silica gmelinite zeolite (GME) without changing the GME structure.

SUMMARY OF THE INVENTION

It is an object of the invention to synthesize low silica gmelinite zeolite adsorbents with high $N_2/O_2$ selectivity.

It is another object of the invention to synthesize low silica AFI zeolite catalysts.

It is yet another object of the invention to synthesize low silica AFI zeolite adsorbents.

It is still yet another object of the invention to synthesize high purity low silica gmelinite zeolites.

It is still yet another object of the invention to provide a high purity gmelinite zeolite that has a $SiO_2/Al_2O_3$ ratio that is about 10 or less.

It is another object of the invention to prepare a gmelinite zeolite that does not have a template.

These and other objects are achieved by the present invention, which includes an AFI zeolite that has a $SiO_2/Al_2O_3$ ratio of about 10 or less.

The present invention also includes a high purity gmelinite zeolite that has a $SiO_2/Al_2O_3$ ratio of about 10 or less.

DETAILED DESCRIPTION OF THE INVENTION

Figure 1:
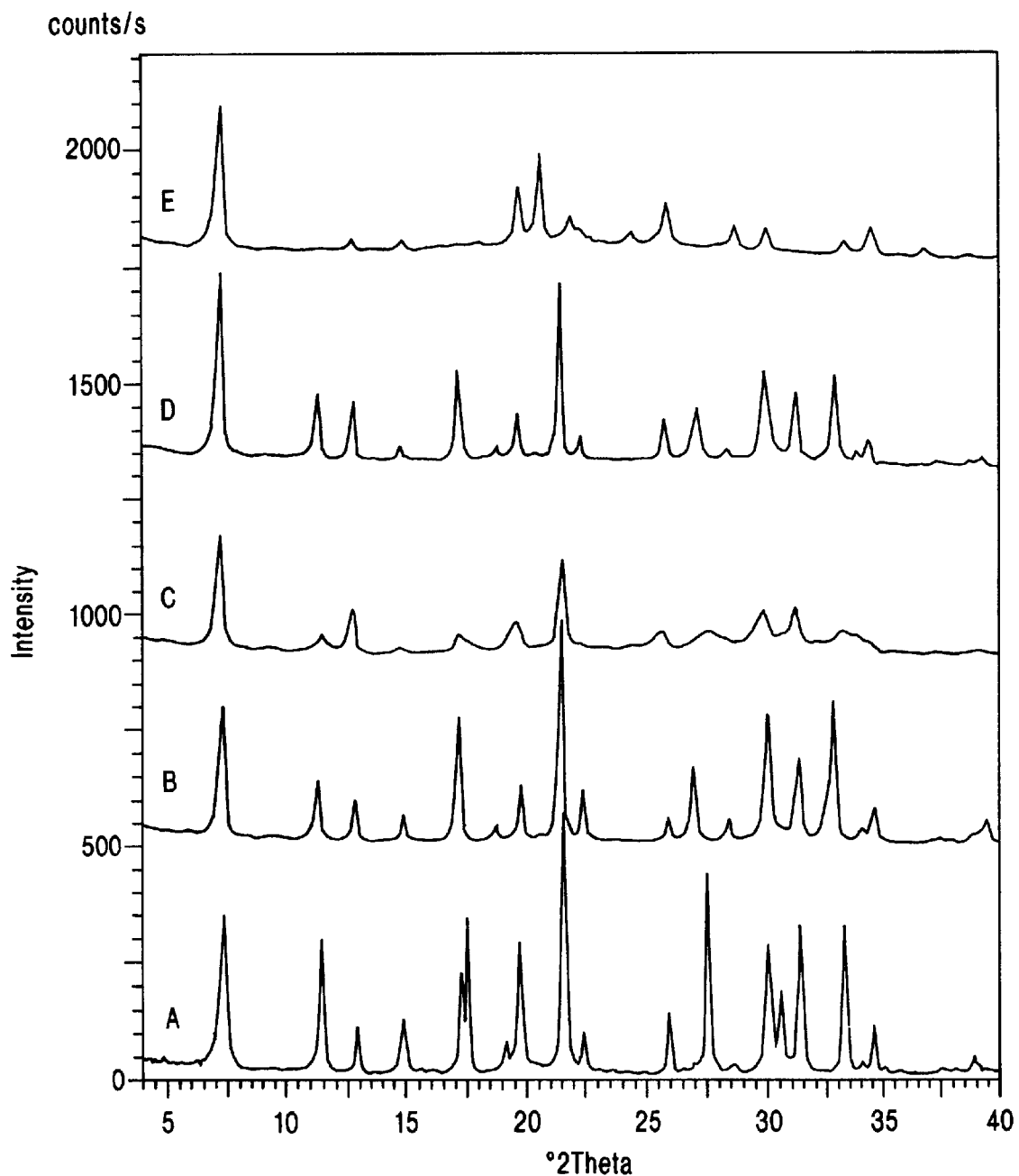
FIG. 1 is a graphical printout displaying the results of X-Ray diffraction analysis of various zeolites during synthesis.

Previously, a zeolite displaying AFI topography with a low $SiO_2/Al_2O_3$ ratio was not available for catalytic or adsorptive applications. Prior art attempts at synthesizing such a porous zeolite were unsuccessful.

The present invention provides low silica zeolites that have AFI topography, wherein the $SiO_2/Al_2O_3$ ratio is about 10 or less. Preferably, the ratio of $SiO_2/Al_2O_3$ is about 2 to about 10, more preferably about 5.

The low silica AFI zeolite is synthesized by transforming a gmelinite zeolite into an AFI zeolite. The method comprises the step of calcining a M-gmelinite that has a quaternary ammonium template to remove the quaternary ammonium template from the M-gmelinite, thereby transforming the M-gmelinite to M-AFI zeolite, wherein M is selected from the group consisting of Na, Li, Ca, Ba, and Mg.

Calcination of the gmelinite zeolite is essential to bring about a polymorphic phase transition that transforms the gmelinite to either high purity M-gmelinite or M-AFI, wherein M is defined by the group consisting of Na, Li, Ca, Ba, and Mg. Typically, the zeolite material is heated to a temperature below its melting point to bring about the phase transition. This may or may not be performed under an $N_2$ or air environment. In the method of the present invention, calcining is performed at a temperature of about 100° C. to about 700° C. Preferably, the temperature is about 300° C. to about 600° C. When M is Na, Li, Ca, Ba, or Mg, the gmelinite transforms to an AFI zeolite by removing the quaternary ammonium template.

Additionally, the method may further comprise the step of providing a Na-gmelinite zeolite that has a quaternary ammonium template.

To produce a Na-AFI zeolite, an Na-gmelinite zeolite that has a quaternary ammonium template, is calcined. This removes the template and transforms the structure of the Na-gmelinite to the Na-AFI zeolite. Depending on the purity of the Na-gmelinite zeolite, an ion exchange step may or may not be included.

In a further embodiment, an ion exchanging step may be included. The ion exchanging step substitutes Na ions with other cations, from the Na-gmelinite that has a quaternary ammonium template. Preferably, the Na ions are substituted with R ions, thereby forming a R-gmelinite with a quaternary ammonium template, wherein R is selected from the group consisting of Li, Ca, Ba, and Mg. This step is typically performed with an aqueous solution at 80° C.–100° C. Preferably, the molar concentration of the mixture of inorganic cations to be exchanged is at least 10%.

The new AFI material has a low silica framework, which will enhance the catalytic utility of SSZ-24. The AFI structure is substantially different from other known 12-ring zeolites. It is expected to behave and exhibit similar properties to other 12-ring channel low silica zeolites and be useful in catalysis, adsorption, and separation processes involving organic and inorganic compounds. Zeolites containing 12-ring channels such as mordenite, offretite, gmelinite, cancrinite, mazzite, and Linde L, already have important catalytic properties which make them useful in processes such as isomerization (mordenite and mazzite), dewaxing (mordenite and offretite), and aromation or reforming (Linde L). The AFI zeolite of the present invention can potentially be used in similar applications. In addition, the low silica AFI zeolite may also find use in Pressure Swing Adsorption (PSA) air separation application.

The synthesis of low silica zeolites that have AFI or GME topography is initiated with Na-gmelinite zeolite that has a polymeric template and is thermally unstable. The Na-gmelinite can be synthesized by a variety of methods. In a preferred embodiment, the Na-gmelinite is synthesized using a polymeric quaternary ammonium template synthesis system under mild conditions at a temperature of about 80° C.–100° C. The Na ions are exchange in an aqueous solution at 80° C.–100° C. to form other R-gmelinite (R=Li, Ca, Ba, and Mg).

The polymeric quaternary ammonium template, Dab-4Br, can be synthesized by reacting 1,4-diazabicyclo [2.2.2] octane (DABCO) with Br(CH2)4Br at room temperature for 30 days, then dissolving it in sodium aluminate solution.

Next, a silica-containing solution is added into this solution to form a gel. This reactive gel was heated at 80° C.–100° C. for 3–20 days. The contents are then filtered, washed, and dried. The resulting product is Na-gmelinite, which can be confirmed by X-ray diffraction (XRD) analysis. Other methods known in the art may also be used. Additionally, an ion exchange step can be performed to replace Na cations with other cations.

The present invention also includes a high purity gmelinite zeolite that has a $SiO_2/Al_2O_3$ ratio of about 10 or less. Preferably, the ratio of $SiO_2/Al_2O_3$ is about 2 to about 10, more preferably about 5.

The high purity GME zeolite of the present invention can be synthesized by the method comprising the step of calcining a K-gmelinite having a quaternary ammonium template to remove the quaternary ammonium template, thereby forming a high purity K-gmelinite.

The present inventors have found that a K-gmelinite having a quaternary ammonium template can be calcined to form a high purity K-gmelinite zeolite. The K stabilizes the gmelinite structure and the step of calcining the K-gmelinite zeolite transforms the gmelinite to a high purity K-gmelinite by removing the quaternary ammonium template. The zeolite material is heated to a temperature below its melting point to bring about the phase transition. This may or may not be performed under an $N_2$ or air environment. The calcining is performed at a temperature of about 100° C. to about 700° C. Preferably, the temperature is about 300° C. to about 600° C.

The method of synthesizing the high purity gmelinite zeolite may further comprise the steps of: (a) providing a Na-gmelinite zeolite that has a quaternary ammonium template; and (b) ion exchanging Na ions with K ions, from the Na-gmelinite that has a quaternary ammonium template, thereby forming the K-gmelinite with a quaternary ammonium template, wherein steps (a) and (b) are performed prior to the calcining step.

In addition, a second ion exchange step may be performed after the calcining step. This converts the high purity K-gmelinite to other cation forms. Preferably, the ion exchange step is used to substitute K ions with Q ions to form a Q-gmelinite zeolite, where Q ions are selected from the group consisting of Na, Li, Ca, Ba, and Mg.

The crystalline purity of the resulting high purity gmelinite is at least about 95%, preferably about 100%.

The newly formed high purity gmelinite zeolite exhibits increased porosity and stability. It is expected that the high purity gmelinite zeolite will be useful as an adsorbent for separating fluid mixtures and in catalytic applications for organic transformations.

Powder X-ray diffraction techniques were used to evaluate changes in the zeolite materials during synthesis. In FIG. 1, traces show signals at specific diffraction angles that correspond to the long range ordering of atoms. The traces were compared to reference patterns to identify the specific framework topology. In addition, comparison of the intensities and broadness of individual signals against a reference pattern, provided an indication of sample purity.

To illustrate the present invention, the following examples are provided. It should be understood that the present invention is not limited to the examples described.

EXAMPLE 1

Synthesis of High Quality Na-gmelinite

A gel composition having 5.42 Dab-4Br:1 $Al_2O_3$:16.7 $Na_2O$:30 $SiO_2$:570 $H_2O$ was prepared as follows. First, a sodium aluminate solution (0.4 mol/kg $Al_2O_3$ and 4 mol/kg NaOH) was made by dissolving aluminum hydroxide hydrate (54% $Al_2O_3$, Aldrich) in a solution of NaOH. 25.0 g of sodium aluminate solution and 54.2 g of template Dab-4Br solution (16.4 wt %) were mixed, then 66.6 g of sodium silicate solution (27% $SiO_2$, 14% NaOH, Aldrich) was added. The reaction mixture was stirred at room temperature for 5 minutes, placed in a teflon bottle, and reacted for 12 days at 80° C. in an air convection oven. The product was filtered, washed with water, and dried at 100° C. in an oven. XRD analysis showed the Na-gmelinite has excellent quality based on its characteristic signals, lack of impurity peaks, and the low baseline (see FIG. 1A). Elemental analysis showed that the ratio of $SiO_2/Al_2O_3$=4.6. The final product also contained organic species derived from the organic template.

EXAMPLE 2

Synthesis of Li-GME

A sample of Na-gmelinite, prepared as described in Example 1, was treated with an aqueous solution containing 2 mol/kg KOH and 1 mol/kg KCl by contacting for 1 day at 90° C. It is expected that the molar concentration of the mixture of inorganic cations to be exchanged, must be at least 10%. In this particular case, the molar concentration of potassium is at least 10%. This ion exchange process was repeated three successive times. Use of KOH is optional but desirable, since KOH can dissolve amorphous and other impurities. The product was filtered, washed with water, and dried in an oven at 100° C. XRD analysis showed high quality K-exchanged gmelinite based on its characteristic signals, lack of impurity peaks, and the low baseline (see FIG. 1B).

The K-exchanged gmelinite was calcined in air for 5 hours at 500° C. to remove the organic template. XRD analysis confirmed that the product is gmelinite (see FIG. 1C).

The calcined sample of K-gmelinite was ion exchanged by treatment with an aqueous solution, which contains 2 mol/kg LiCl and pH=9.6, by contacting for 1 day at 80° C. three successive times. The product was filtered, washed with water, and dried in an oven at 100° C. XRD analysis showed excellent gmelinite based on its characteristic signals, lack of impurity peaks, and the low baseline (see FIG. 1D).

EXAMPLE 3

Synthesis of AFI

A sample of gmelinite, prepared as described in Example 1, was calcined in air for 5 hours at 500° C. XRD analysis showed that the product has an AFI structure (FIG. 1E). Heating rate has no significant influence.

EXAMPLE 4

Alternative Preparation of AFI

A sample of gmelinite, prepared as described in Example 1, was ion exchanged by treatment with an aqueous solution containing 2 mol/kg LiCl and pH=9.6, by contacting for 1 day at 90° C. three successive times. The product was filtered, washed with water and dried in an oven at 100° C. XRD analysis showed high quality gmelinite.

The Li-exchanged gmelinite was calcined in air for 5 hours at 500° C. X-ray diffraction analysis showed that the product has an AFI structure.

Ba, Ca, and Mg ion exchanged gmelinite samples were prepared as using the general method described for preparation of Li-exchanged gmelinite described above. In all cases, the calcined products have the AFI structure.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A low silica AFI zeolite that has a $SiO_2/Al_2O_3$ ratio of about 10 or less.

2. A method of synthesizing the low silica AFI zeolite of claim 1, comprising the step of:

calcining a M-gmelinite having a quaternary ammonium template, thereby transforming said M-gmelinite to M-AFI zeolite, wherein M is selected from the group consisting of Na, Li, Ca, Ba, and Mg.

3. The method of claim 2, further comprising the step of providing a Na-gmelinite zeolite that has a quaternary ammonium template, prior to said calcining step.

4. The method of claim 3, further comprising the step of ion exchanging Na ions with R ions, from said Na-gmelinite zeolite that has a quaternary ammonium template, thereby forming said M-gmelinite with a quaternary ammonium template wherein R is selected from the group consisting of Li, Ca, Ba, and Mg.

5. The method of claim 2, wherein said calcining step is performed at a temperature of about 100° C. to about 700° C.

6. The method of claim 3, wherein said Na-gmelinite zeolite is the reaction product of a polymeric quaternary ammonium template dissolved in a sodium aluminate solution, wherein a silica containing solution is added, thereby forming a gel; wherein said polymeric quaternary ammonium template is the reaction product of 1,4-diazabicyclo[2.2.2]octane and 1,4-dibromobutane; and wherein said Na-gmelinite is synthesized at a temperature of about 80° C. to about 100° C.

7. A method of catalytically transforming inorganic or organic compounds comprising the steps of:

providing the low silica AFI zeolite of claim 1; and
   reacting the inorganic or organic compounds in the presence of said low silica AFI zeolite.

8. A method of separating fluid mixtures comprising the steps of:

providing the low silica AFI zeolite of claim 1; and
   passing a fluid through said low silica AFI zeolite.

* * * * *